(12) United States Patent
Vonderahe et al.

(10) Patent No.: US 7,584,981 B2
(45) Date of Patent: Sep. 8, 2009

(54) MODULAR BUNK COVER APPARATUS AND SYSTEM

(76) Inventors: Roger P. Vonderahe, 610 Macintosh Rd., Rochester, NY (US) 14626; Peter J. Danish, 299 Morgan Rd., Scottsville, NY (US) 14546

( * ) Notice: Subject to any disclaimer, the term of this patent is extended or adjusted under 35 U.S.C. 154(b) by 206 days.

(21) Appl. No.: 11/401,597

(22) Filed: Apr. 11, 2006

(65) Prior Publication Data
US 2007/0001086 A1    Jan. 4, 2007

Related U.S. Application Data

(63) Continuation-in-part of application No. 11/171,662, filed on Jun. 30, 2005, now abandoned.

(51) Int. Cl.
*B60P 3/10* (2006.01)
(52) U.S. Cl. .................. 280/414.1; 280/414.3
(58) Field of Classification Search ............. 280/414.1, 280/414.3; 248/687; 220/241; 174/21 JS, 174/66; 104/275–277; 114/353
See application file for complete search history.

(56) References Cited

U.S. PATENT DOCUMENTS

| | | | |
|---|---|---|---|
| 3,729,572 A * | 4/1973 | Helin ........................... 174/66 |
| 4,841,900 A * | 6/1989 | Maselko ...................... 114/353 |
| 5,015,013 A * | 5/1991 | Nadin ........................... 285/64 |
| 5,975,005 A * | 11/1999 | Yoshioka ..................... 114/353 |
| 5,993,063 A | 11/1999 | Stewart |
| 6,189,909 B1 | 2/2001 | Danchuk |
| 6,651,997 B2 | 11/2003 | Higginson |
| 6,830,410 B2 | 12/2004 | Davidson et al. |
| 7,055,449 B2 * | 6/2006 | Brown ........................ 114/263 |
| 7,112,744 B1 * | 9/2006 | DeCosta ....................... 174/66 |
| 7,133,279 B2 * | 11/2006 | Lin ............................ 361/679 |
| 2003/0026662 A1 * | 2/2003 | Vidal et al. ................. 405/157 |
| 2003/0070391 A1 * | 4/2003 | Tachauer et al. .......... 52/745.21 |
| 2004/0187400 A1 * | 9/2004 | Anderson et al. ............. 52/79.1 |
| 2007/0170692 A1 * | 7/2007 | MacKarvich ............ 280/414.1 |
| 2007/0209558 A1 * | 9/2007 | Isle et al. .................. 108/57.25 |

* cited by examiner

*Primary Examiner*—Lesley D Morris
*Assistant Examiner*—Maurice Williams
(74) *Attorney, Agent, or Firm*—Patent Technologies, LLC; Robert D. Gunderman, Jr.

(57) ABSTRACT

A modular bunk cover apparatus and system for protecting the hull of a watercraft from abrasive contact with a bunk, such as the bunks found on boat trailers, boat lifts, boat storage racks, and the like. The modular bunk cover apparatus and system can be installed on an existing bunk without removing the bunk from the trailer or other structure. The modular bunk cover apparatus and system facilitates easy launching and loading of a boat on a trailer or boat lift. The system is a replacement for carpet systems that tend to degrade over time, eventually falling off the bunk and subsequently creating a hazard for marine life, birds, and mammals.

10 Claims, 19 Drawing Sheets

MODULAR BUNK COVER APPARATUS AND SYSTEM

CROSS-REFERENCE TO RELATED PATENT APPLICATIONS

This application is a continuation in part of applicant's patent application Ser. No. 11/171,662 filed on Jun. 30, 2005 now abandoned.

BACKGROUND OF THE INVENTION

1. Field of the Invention

This invention relates generally to watercraft supporting structures, and more particularly to a modular apparatus and system for covering a watercraft supporting structure.

2. Description of Related Art

Many forms of watercraft trailers, lifts, and hoists require the use of rollers, bunks, skids, glides, or similar devices to both ease the movement of a watercraft on the trailer, lift, or hoist, and to support the watercraft on the trailer, lift, or hoist. Carpet covered bunks are commonly used on watercraft trailers, lifts and hoists for such purposes. Bunks are typically elongated planks of wood or metal that traverse the bottom of a watercraft to support the watercraft on a trailer, lift or hoist. The purpose of the carpet covering on the bunk is primarily to protect the bottom of the watercraft from potential damage that could be inflicted by contact of the bunk with the bottom of the watercraft. The carpet also serves to increase surface friction between the watercraft hull and the bunk.

The use of carpet on a bunk presents several problems to the watercraft owner. U.S. Pat. No. 6,189,909 to Danchuk, entitled "Friction-Reducing Support Member Protection Device" (page 1, lines 51-54) states that "the skid-covering carpet tends to deteriorate quickly with continued use. And although skids with deteriorated coverings may still support a watercraft, worn spots increase sliding friction and can permanently damage watercraft hulls."

U.S. Pat. No. 6,651,997 to Higginson, entitled "Trailer Bunk Cover Assembly" (page 1, lines 46-61) explains that "bunk-covering carpet tends to deteriorate quickly with continued use. The carpet material when exposed to moisture, and in this case when submerged in water, traps the moisture thereby exposing the wood bunks to an extended period of moisture exposure. Further, the carpet material will deteriorate through environmental conditions such as mildew brought about by moisture. And although bunks with deteriorated coverings may still support the boat, worn spots increase sliding friction and can permanently damage boat hulls. As a result, the carpet material is replaced frequently, and the wood bunks are replaced more often."

Carpet material that deteriorates and subsequently falls from a boat trailer or boat lift bunk is often times left in the water through either lack of notice or lack of care by the owner of the boat and trailer. The carpet material often times remains in the body of water, and becomes unraveled and further deteriorated over time. This creates not only a degradation to the water environment, but poses a threat to marine life and birds, who may become entangled in a partially decomposed and unraveled mass of carpet material.

U.S. Pat. No. 6,651,997 to Higginson, entitled "Trailer Bunk Cover Assembly" discloses a soft vinyl cover assembly with recessed portions that is mounted to the top surface of a trailer bunk. Soft Vinyl covers are sold by Harley Corporation, Evansville, Ind. under the tradename BUNKAPS®, and are marketed through the internet at www.bunkaps.com.

In addition to carpet material, there are various pads that can be used to cover a bunk. For example, one such device is a product known as "E-Z SLIDE TRAILER PADS" by IRONWOOD PACIFIC™, Inc. of Lake Oswego, Oreg. Reference also is made to U.S. Pat. No. 5,993,063 to Stewart entitled "Skid Plate for Installation on a Boat Trailer Bunk". The skid plates disclosed in the '063 patent comprise an elongate main body that is attached to a bunk.

U.S. Pat. No. 6,830,410 to Davidson and Hey, entitled "Bunk Beam and Bunk Cushion Apparatus for Supporting a Watercraft" discloses an apparatus for supporting the hull of a watercraft using a flexible bunk beam and a convex cushion attached to the beam using locking elements.

U.S. Pat. No. 6,189,909 to Danchuk, entitled "Friction-Reducing Support Member Protection Device" discloses a watercraft trailer support skid assembly that includes a protective sleeve sized and shaped to fit the contoured free end of an existing watercraft support skid.

Many of the bunk covering devices of the related art are attached to a bunk or skid using metal fasteners that have a tendency to corrode or work loose, creating the potential for damage to a hull of the boat that they were designed to protect. Many of the bunk covering devices of the related art also have a tendency to retain moisture which, over the long term, causes damage to both the bunk and the boat hull. In addition, many of the bunk covering devices of the related art do not provide uniform hull weight distribution across the length of the bunk. Many of the bunk covering devices of the related art are also cumbersome to ship and to install, and must be cut to size prior to application to a bunk. Many of the bunk covering devices of the related art also do not expand and contract at the same rate as the bunk, and will distort and buckle with temperature changes. It is therefore an object of the present invention to provide a modular bunk cover apparatus and system that does not rely on metal fasteners for retention to a bunk. It is another object of the present invention to provide a modular bunk cover apparatus and system that does not retain moisture. It is yet another object of the present invention to provide a modular bunk cover apparatus and system that uniformly distributes the weight of a watercraft hull across the length of the bunk. It is still another object of the present invention to provide a modular bunk cover apparatus and system that can be easily installed in small sections. It is still a further object of the present invention to provide a modular bunk cover apparatus and system that will not distort or buckle with changes in temperature. It is a further object of the present invention to provide a modular bunk cover apparatus and system that will allow for a coefficient of friction that varies along the length of a bunk, and may be customized to fit a particular application.

BRIEF SUMMARY OF THE INVENTION

In accordance with the present invention, there is provided a modular bunk cover comprising a first half sleeve having a plurality of tongues wherein each tongue contains a slot and a plurality of receivers wherein each receiver contains a locking tab, the first half sleeve being connected to a second half sleeve having a plurality of tongues wherein each tongue contains a slot and a plurality of receivers wherein each receiver contains a locking tab; wherein the tongues of the first half sleeve are mated to the receivers of the second half sleeve and wherein the tongues of the second half sleeve are mated to the receivers of the first half sleeve and wherein the locking tabs of the first half sleeve receivers are inserted in the slots of the second half sleeve tongues and the locking tabs of the second half sleeve receivers are inserted in the slots of the first half sleeve tongues.

The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which.

Figure 1:
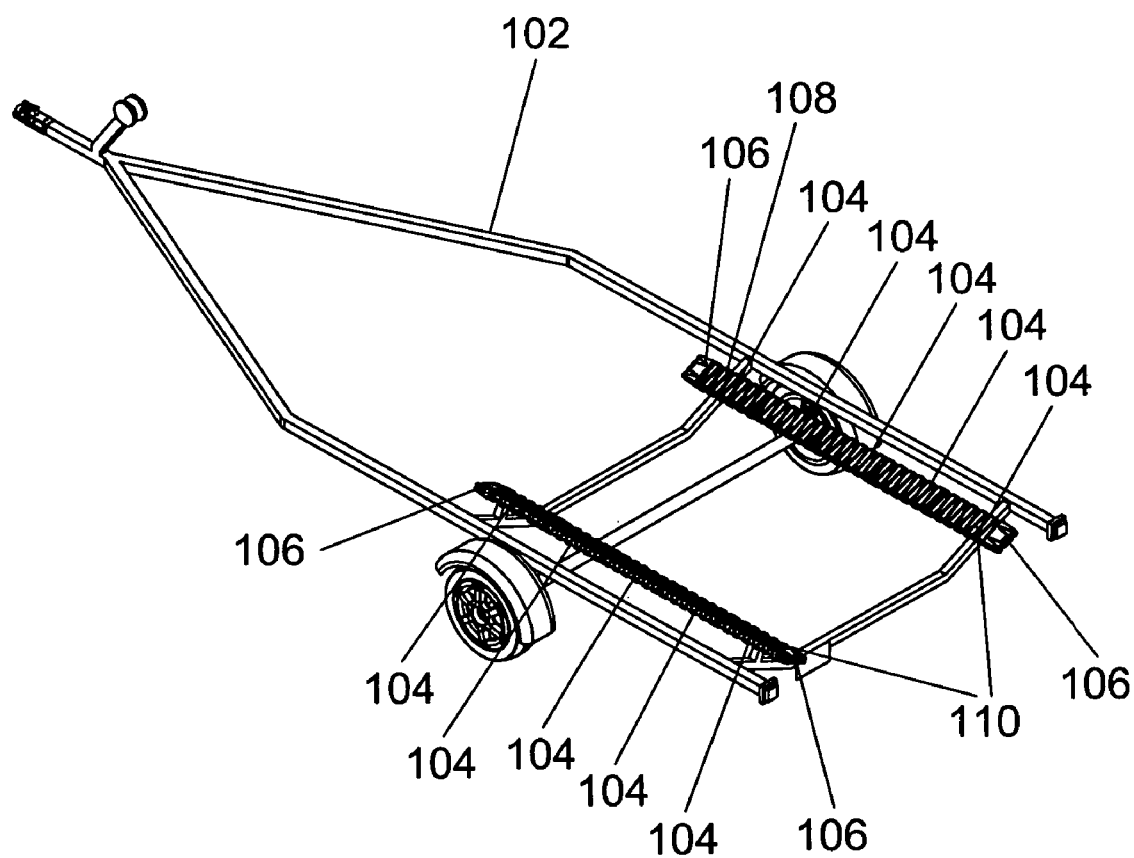
FIG. 1 is a perspective view of a modular bunk cover apparatus and system in use on a boat trailer.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

In this specification, a bunk is defined to be an elongated member that traverses a surface of a watercraft to support or otherwise retain the watercraft on a trailer, lift, hoist, trolley, rack, dock, pier, or the like.

FIG. 1 is a perspective view of a modular bunk cover apparatus and system in use on a boat trailer. Referring to FIG. 1, a typical boat trailer 102 is shown. The boat trailer 102 has two bunks 110 that are used to retain a boat and guide the boat on and off the trailer. Some boat trailers may have variations to the bunks 110 that are depicted in FIG. 1. The boat trailer 102 in FIG. 1 is provided is to exemplify a typical application for the modular bunk cover apparatus and system, but is not intended to be a limitation of the present invention. Shown covering the bunks 110 in FIG. 1 are a plurality of modular bunk covers 104 that are interconnected, and terminate at either end of the bunk 110 with an end cap 106. The modular bunk covers 104 may vary in length from about 3 inches to about 36 inches. In one embodiment of the present invention, the modular bunk covers 104 are about 18 inches in length. The end caps 106 may vary in length from about 1 inch to about 9 inches. In one embodiment of the present invention, the end caps 106 are 3 inches in length. Other lengths of modular bunk covers 104 and end caps 106 may also be used, without departing from the spirit and scope of the present invention as defined by this specification and the appended claims. The plurality of bunk covers 104 and end caps 106 are interconnected to form a modular bunk cover system.

Figure 2:
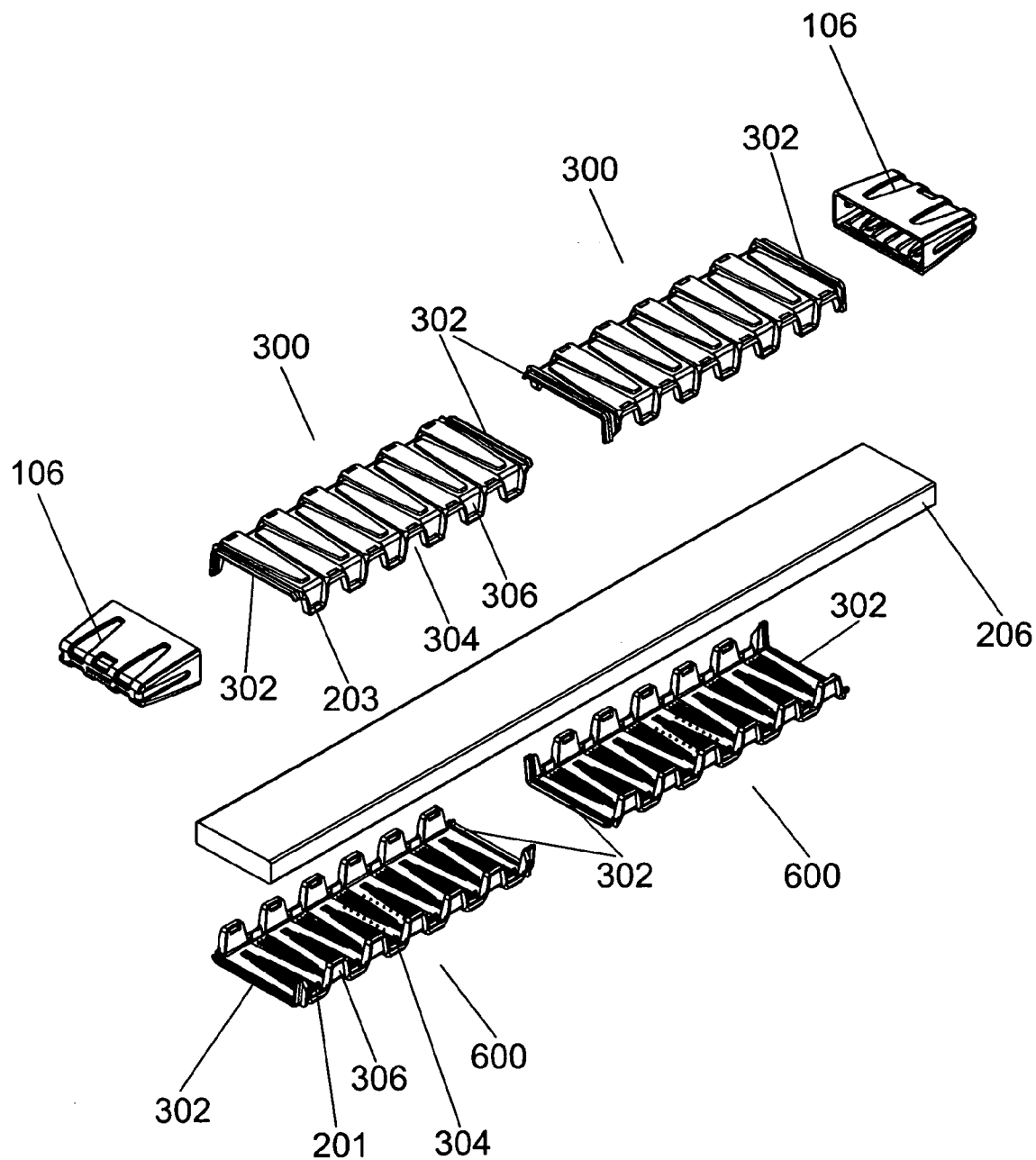
FIG. 2 is an exploded view of the modular bunk cover apparatus and system on a bunk.

For a better understanding of the modular bunk cover apparatus and system, and the way in which the modular bunk cover 104 is made and used, we refer now to FIG. 2. The modular bunk cover 104, prior to being attached to a bunk support member 206, is comprised of a half sleeve 600 and an overmolded half sleeve 300. The half sleeve 600 and the overmolded half sleeve 300 are of the same basic geometry, and will interconnect about a bunk support member 206. Each half sleeve contains a plurality of tongues 306 and alternating receivers 304. Each tongue 306 contains a slot 203 and each receiver 304 contains a tab 201. To use the modular bunk cover apparatus and system, two half sleeves are placed about a bunk support member 206 such that the tongues of one half sleeve align with the receivers of an opposing half sleeve. The two half sleeves are then brought together about the bunk support member 206 such that the tabs 201 of one half sleeve are inserted in the slots 203 of the opposing half sleeve. The tabs 201 will engage in the slots 203 of the opposing half sleeve, causing the two half sleeves to be retained together. The tabs 201 may, in some embodiments of the present invention, contain a beveled edge or similar locking structure to prevent the tab 201 from backing out of the slot 203. The overmolded half sleeve 300 may also, in some embodiments of the present invention, be replaced with a half sleeve 600. It should be noted that the half sleeve 600 and the overmolded half sleeve 300 are interchangeable due to the alternating pattern of tongues 306 and receivers 304 contained on each half sleeve. To form a modular bunk cover 104, a first half sleeve and a second half sleeve are joined about a bunk support member. The half sleeves may be any combination of half sleeves 600 and overmolded half sleeves 300, as they are fully interchangeable. The overmolded half sleeve 300 and the half sleeve 600 also contain an expansion joint 302 that serves several purposes. The expansion joint 302, as will be seen further in subsequent drawings, is an accordion-like structure that allows each half sleeve to expand and contract along the length of the bunk support member 206. This becomes of particular importance when a boat trailer, for example, has been sitting in a hot parking lot all day, and is then immersed in cool water when used. The expansion joint 302 may also, in some embodiments of the present invention, serve to interlock one modular bunk cover apparatus 104 with an adjacent modular bunk cover apparatus 104, both of which are placed on a bunk support member 206. As will be further described later in this specification, the overmolded half sleeve 300 has a friction altering overmolded material, referred to as an overmold, on a portion of it's surface. The modular bunk cover system may also include an end cap 106.

Figure 2A:
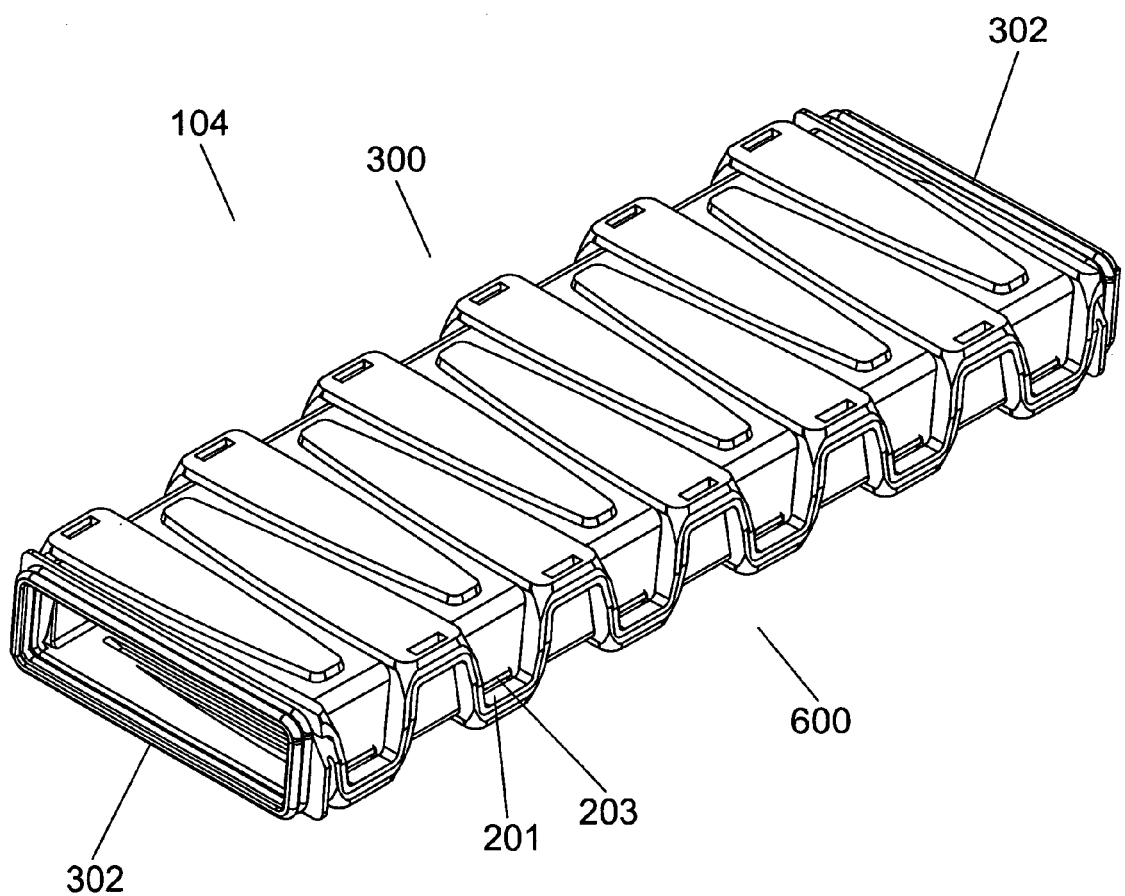
FIG. 2A is a perspective view of a modular bunk cover apparatus showing the half sleeves interconnected.

FIG. 2A shows a modular bunk cover apparatus 104 after the overmolded half sleeve 300 and the half sleeve 600 are interconnected as previously described. The bunk support member 206 is not shown for clarity. The cooperation between the tab 201 and the slot 203, and the related tongue and receiver structures of each half sleeve is clearly shown.

Figure 3:
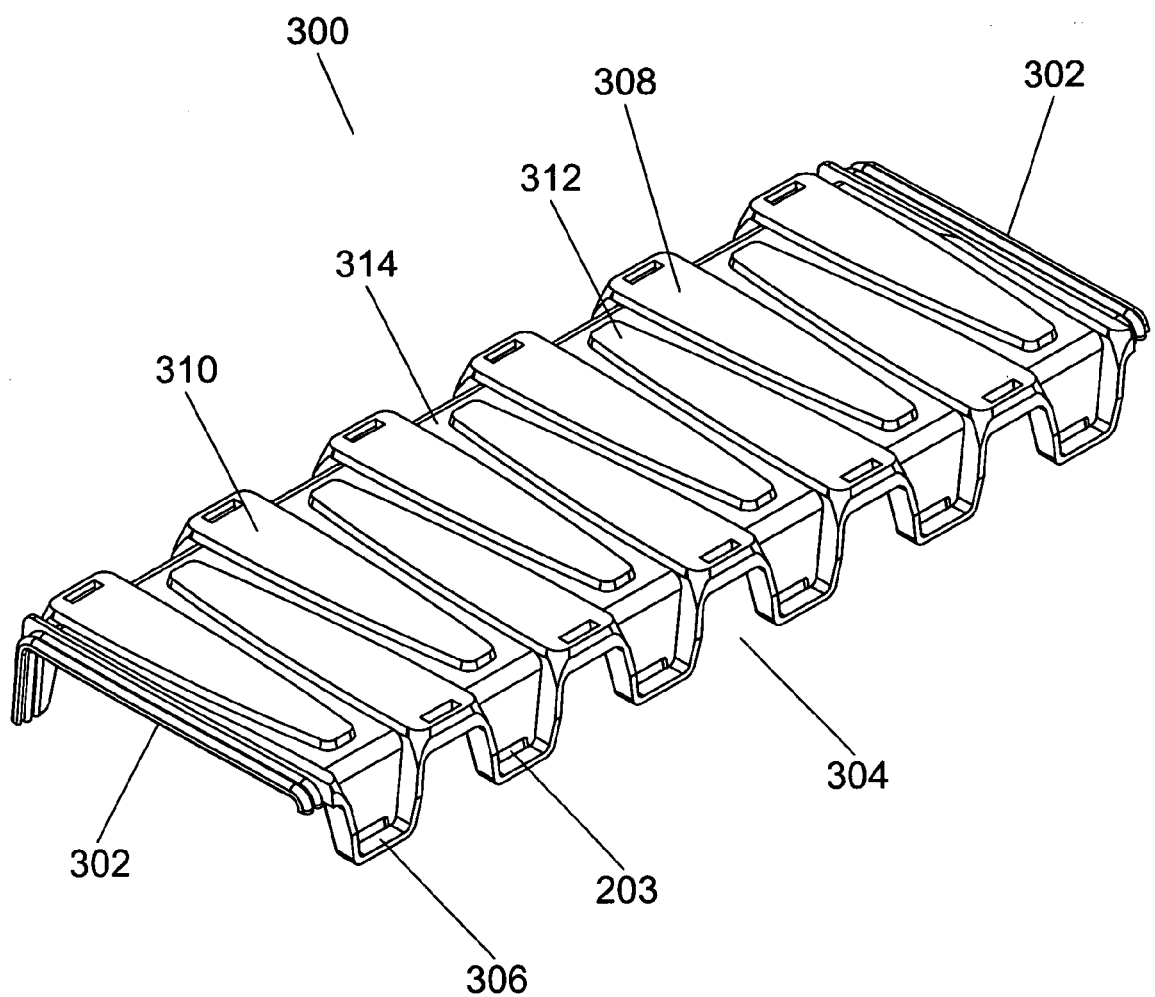
FIG. 3 is a perspective view of an overmolded half sleeve of the modular bunk cover apparatus.

FIG. 3 shows a perspective view of an overmolded half sleeve 300 of the modular bunk cover apparatus. The tongues 306 and the receivers 304 can be clearly seen. The slots 203 can be seen on each tongue 306. The tabs 201 are not however, visible in this perspective view, but are located within each receiver 304. The overmolded half sleeve contains a plurality of fingers 310 interspersed by a plurality of opposing fingers 312, and separated by a drainage space 314. The fingers 310 and the opposing fingers 312 serve as a contact surface where a boat hull (not shown) will rest. The drainage space 314 formed by the interspersed fingers 310 and opposing fingers 312 serves to drain water away from a boat hull. The overmolded half sleeve 300 may be molded from a plastic using injection molding techniques that are commonly known to those skilled in the art. The overmolded half sleeve 300 may be primarily made from a plastic such as polypropylene, polystyrene, Acrylonitrile-butadiene-styrene, Polycarbonate, Nylon, Polyethylene-terephthalate, Acetal Resin (such as DELRIN™ from DUPONT™), or an acrylic, metal, fiberglass, molded graphite, wood, or another plastic material. In a preferred embodiment of the present invention, the overmolded half sleeve 300 is made from a plastic that contains an ultraviolet inhibitor. Other additives to the plastic may include antimicrobials such as Clariant MBP 9661 manufactured by Ashland Chemical Company in Dublin, Ohio. Scratch and mar resistant additives such as Siloxane manufactured by Ashland Chemical Company in Dublin, Ohio may also be added to the plastic. Other additives and formulations may also be used without departing from the spirit and broad scope of the invention as described herein. The overmold 308 may be formed from an elastomeric material such as a thermoplastic elastomer. An example of a thermoplastic elastomer is SANTOPRENE™ from Advanced Elastomer Systems, Akron, Ohio. The overmold 308 may, in some embodiments of the present invention, be pigmented to provide contrasting color to the overmolded half sleeve 300. The overmold 308 may be attached to a surface of the overmolded half sleeve 300, such as the fingers 310 and the opposing fingers 312, using bonding techniques such as chemical bonding, thermal bonding, mechanical bonding, or other such techniques that are known to those skilled in the art. The overmold 308 may also be attached to a surface of the overmolded half sleeve through a coinjection molding process, such as the coinjection molding process described in U.S. Pat. No. 6,562,276 entitled "Process for Forming a Multilayer, Coinjected Article", the entire disclosure of which is incorporated by reference herein.

In use, one may place the modular bunk cover 104 that contains the overmolded half sleeve 300 at various points along a bunk to facilitate the loading and unloading of a boat on a trailer. For example, one may assemble modular bunk covers 104 made of two half sleeves 600 toward the front of a bunk, with the rear of the bunk containing modular bunk covers 104 made of an overmolded half sleeve 300 and a half sleeve 600. This technique will allow a boat to slide freely from a trailer when the trailer and boat are partially submerged in water, making the loading and unloading process easier. In other applications, one may use various overmolded half sleeves 300 containing varying overmolds to change the performance characteristics of the bunk cover system.

Figure 4:
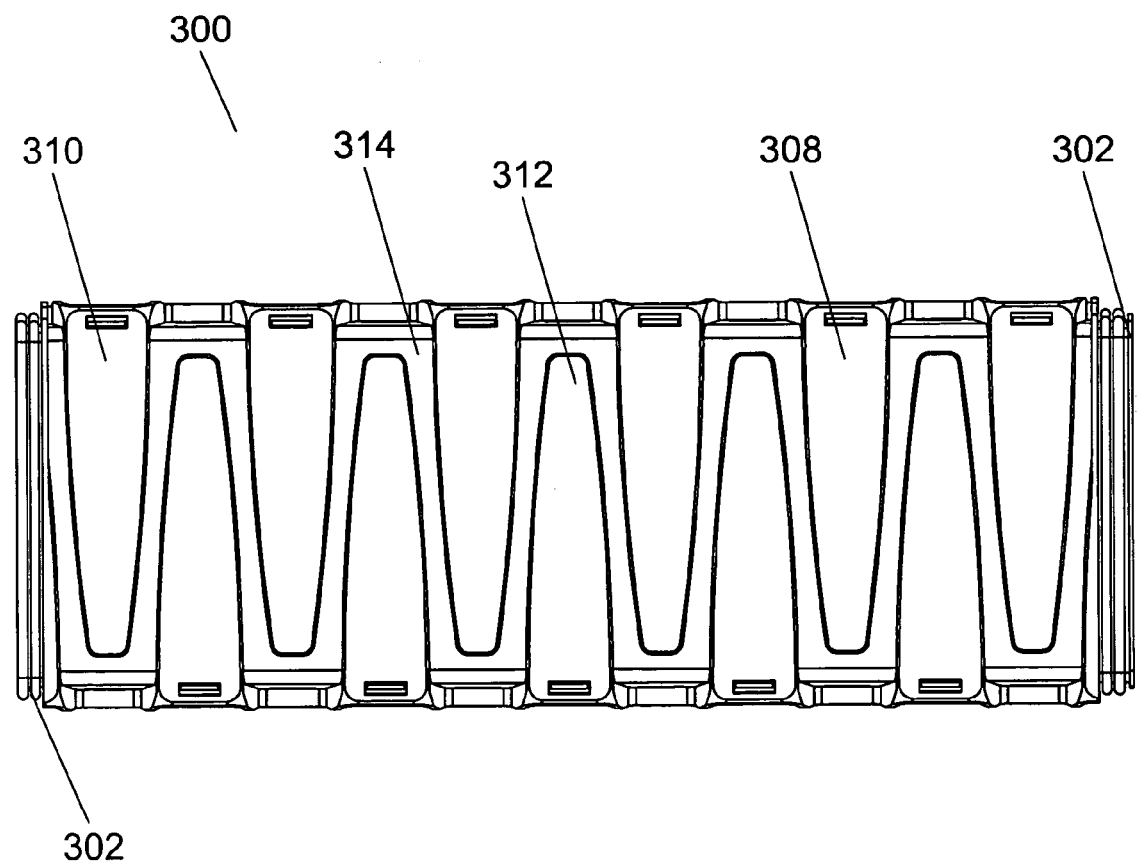
FIG. 4 is a top plan view of an overmolded half sleeve of the modular bunk cover apparatus.

Referring now to FIG. 4, a top plan view of an overmolded half sleeve 300 of the modular bunk cover apparatus is shown. A plurality of fingers 310 interspersed by a plurality of opposing fingers 312, and seperated by a drainage space 314, is clearly seen in FIG. 4. The overmold 308 is also shown on the fingers. Also, expansion joints 302 can be seen at either end of the overmolded half sleeve 300. An overmolded half sleeve 300, in one embodiment of the present invention, is capable of interconnecting with a half sleeve 600 or another overmolded half sleeve 300 to form a modular bunk cover 104.

Figure 5:
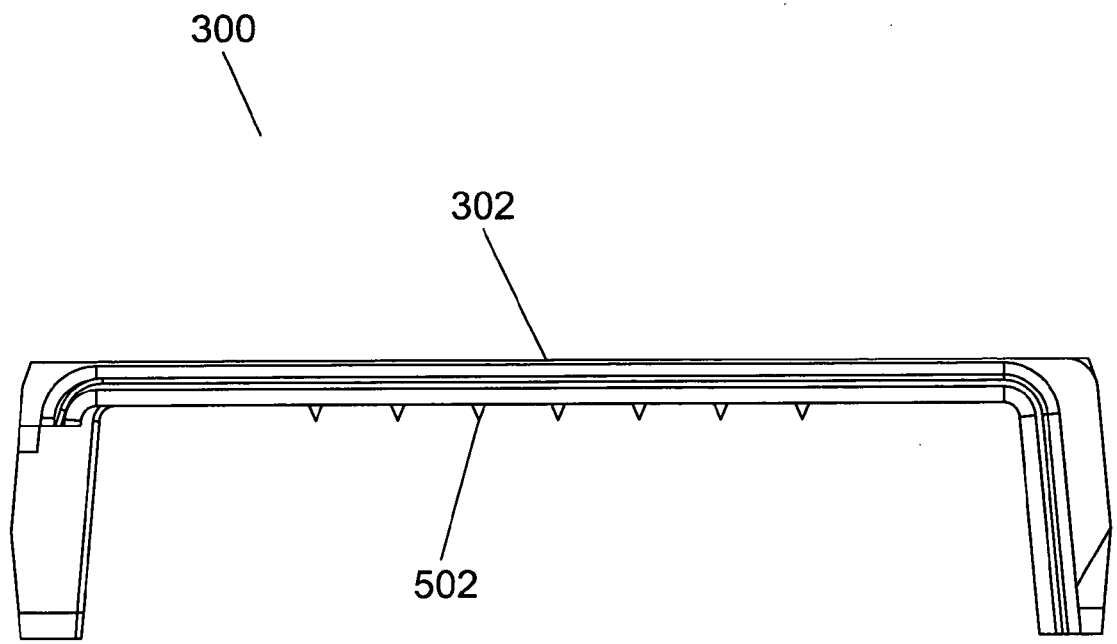
FIG. 5 is a cutaway sectional view of an overmolded half sleeve of the modular bunk cover apparatus.

Turning now to FIG. 5, a cutaway sectional view of an overmolded half sleeve 300 is depicted. In one embodiment of the present invention, spikes 502 are formed on the inside surface of the overmolded half sleeve 300. The inside surface is defined to be the surface of the overmolded half sleeve 300 that faces a bunk support member such as a section of dimensional lumber. The spikes 502 are, in one embodiment of the present invention, injected molded with the overmolded half sleeve 300. The spikes 502 are, in other embodiments of the present invention, mechanically, chemically, or thermally bonded to the inside surface of the overmolded half sleeve 300. The spikes may, in some embodiments of the present invention, be made from a plastic or a metal. FIG. 5 also shows end detail of the expansion joint 302.

Figure 6:
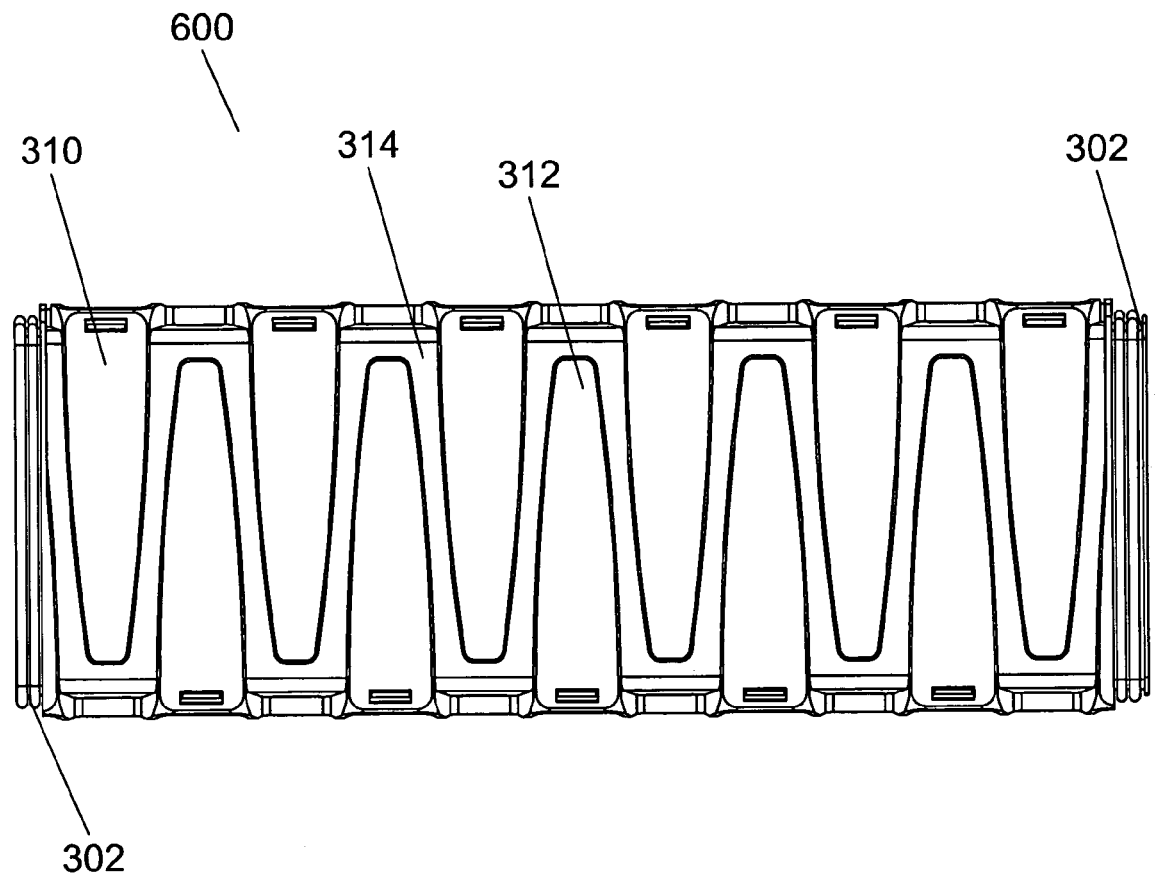
FIG. 6 is a top plan view of a half sleeve of the modular bunk cover apparatus.

FIG. 6 is a top plan view of a half sleeve 600 of the modular bunk cover apparatus. A plurality of fingers 310 interspersed by a plurality of opposing fingers 312, and seperated by a drainage space 314, is clearly seen in FIG. 6. Expansion joints 302 can also be seen at either end of the half sleeve 600. A half sleeve 600, in one embodiment of the present invention, is capable of interconnecting with another half sleeve 600 or an overmolded half sleeve 300 to form a modular bunk cover 104.

Figure 7:
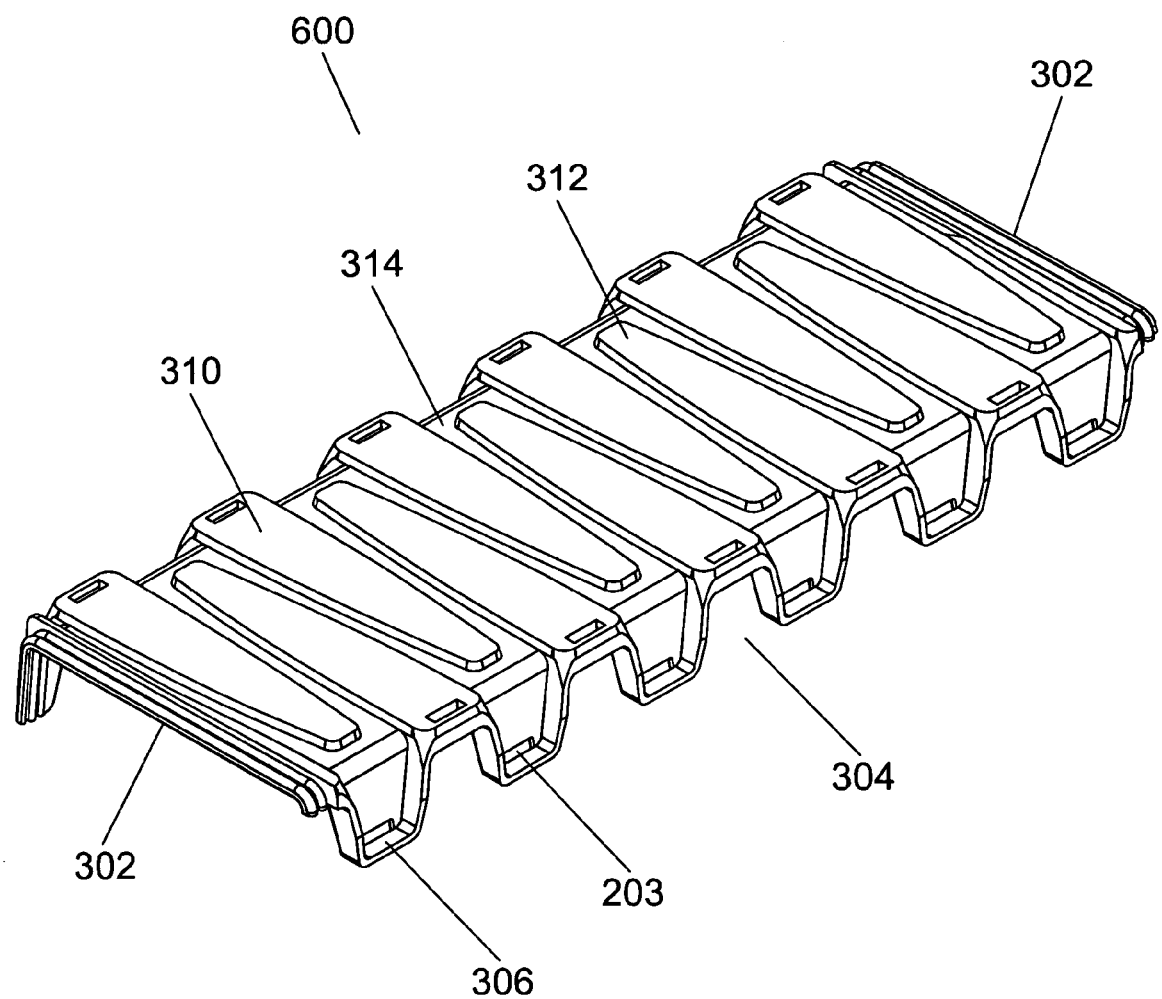
FIG. 7 is a perspective view of a half sleeve of the modular bunk cover apparatus.

FIG. 7 is a perspective view of a half sleeve 600 of the modular bunk cover apparatus. The tongues 306 and the receivers 304 can be clearly seen. The slots 203 can be seen on each tongue 306. The tabs 201 are not however, visible in this perspective view, but are located within each receiver 304. The half sleeve 600 contains a plurality of fingers 310 interspersed by a plurality of opposing fingers 312, and separated by a drainage space 314. The drainage space 314 formed by the interspersed fingers 310 and opposing fingers 312 serves to drain water away from a boat hull. The half sleeve 600 may be molded from a plastic using injection molding techniques that are commonly known to those skilled in the art. The half sleeve 600 may be primarily made from a plastic such as polypropylene, polystyrene, Acrylonitrile-butadiene-styrene, Polycarbonate, Nylon, Polyethylene-terephthalate, Acetal Resin (such as DELRIN™ from DUPONT™), or an acrylic, metal, fiberglass, molded graphite, wood, or another plastic material. In a preferred embodiment of the present invention, the half sleeve 600 is made from a plastic that contains an ultraviolet inhibitor.

Figure 8:
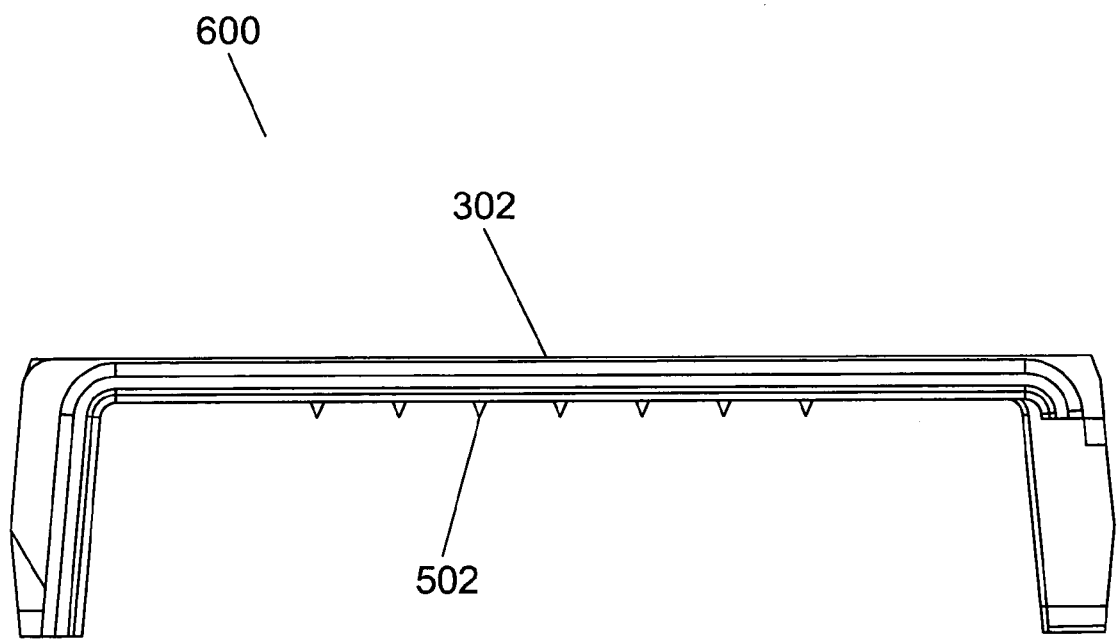
FIG. 8 is a cutaway sectional view of a half sleeve of the modular bunk cover apparatus.

FIG. 8 is a cutaway sectional view of a half sleeve 600 of the modular bunk cover apparatus. In one embodiment of the present invention, spikes 502 are formed on the inside surface of the half sleeve 600. The inside surface is defined to be the surface of the half sleeve 600 that faces a bunk support member such as a section of dimensional lumber. The spikes 502 are, in one embodiment of the present invention, injected molded with the half sleeve 600. The spikes 502 are, in other embodiments of the present invention, mechanically, chemically, or thermally bonded to the inside surface of the half sleeve 600. The spikes may, in some embodiments of the present invention, be made from a plastic or a metal. FIG. 8 also shows end detail of the expansion joint 302.

Figure 9:
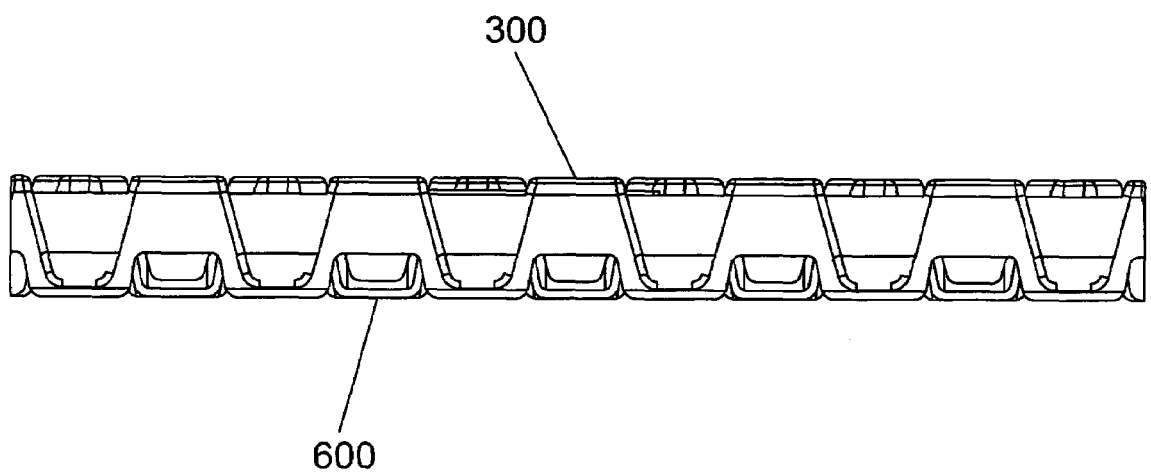
FIG. 9 is a side view of the modular bunk cover apparatus in use showing a half sleeve coupled to an overmolded half sleeve.

FIG. 9 is a side view of the modular bunk cover apparatus in use showing a half sleeve 600 coupled to an overmolded half sleeve 300. A bunk support member 206 has not been shown, for clarity. In some embodiments of the present invention, A half sleeve 600 is capable of interconnecting with another half sleeve 600 or an overmolded half sleeve 300 to form a modular bunk cover 104.

Figure 10:
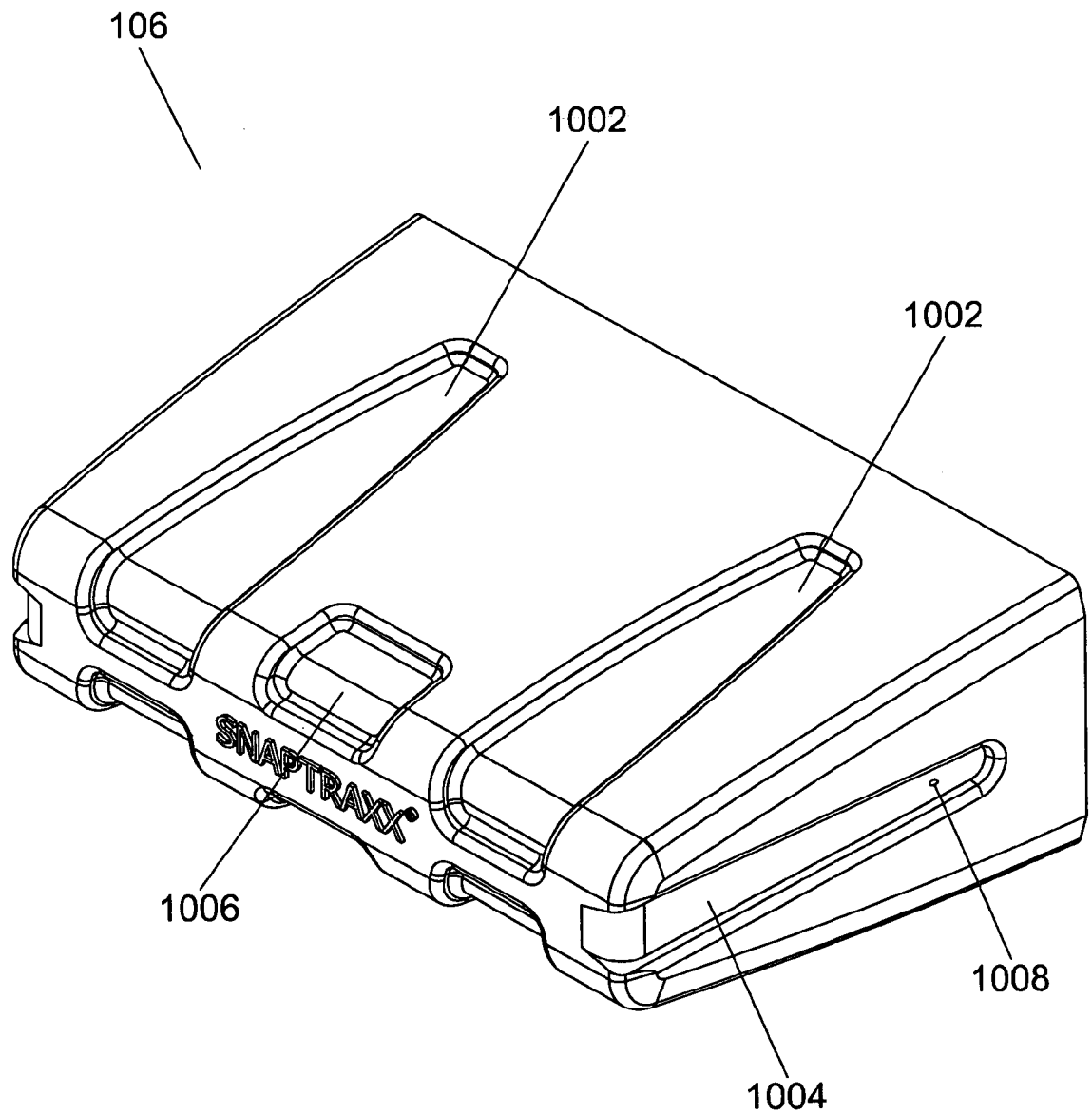
FIG. 10 is a perspective view of an end cap of the modular bunk cover apparatus and system.

FIG. 10 is a perspective view of an end cap 106 of the modular bunk cover apparatus and system. The end cap 106 attaches to either end of a bunk support member 206, as shown previously in FIG. 1. The end cap 106 serves to protect the hull of a boat from the blunt ends of a typical bunk support member 206, such as a typical bunk support member made from dimensional lumber. The end cap 106 also serves to retain modular bunk covers 104 that have been installed on a bunk support member 206, as shown previously in FIG. 1. The end cap 106 may be primarily made from a plastic such as polypropylene, polystyrene, Acrylonitrile-butadiene-styrene, Polycarbonate, Nylon, Polyethylene-terephthalate, Acetal Resin (such as DELRIN™ from DUPONT™), SANTOPREN™ from Advanced Elastomer Systems, Akron, Ohio, or an acrylic, metal, fiberglass, molded graphite, wood, or another plastic material. In a preferred embodiment of the present invention, the end cap 106 is made from a plastic that contains an ultraviolet inhibitor. The end cap 106 further contains drainage coves 1002 to facilitate removal of water that could become trapped between a boat hull and a bunk. The end cap 106 may also, in some embodiments of the present invention, contain a truncated drainage cove 1006. The sides of the end cap 106 may also contain channels 1004. Each channel 1004 may contain an optional screw location 1008. To place the end cap 106 on a bunk support member, the end cap 106 is merely pushed onto an end of the bunk support member. Should additional mechanical retention be necessary, a screw may be placed in the optional screw location 1008 and driven into the bunk support member 206.

Figure 11:
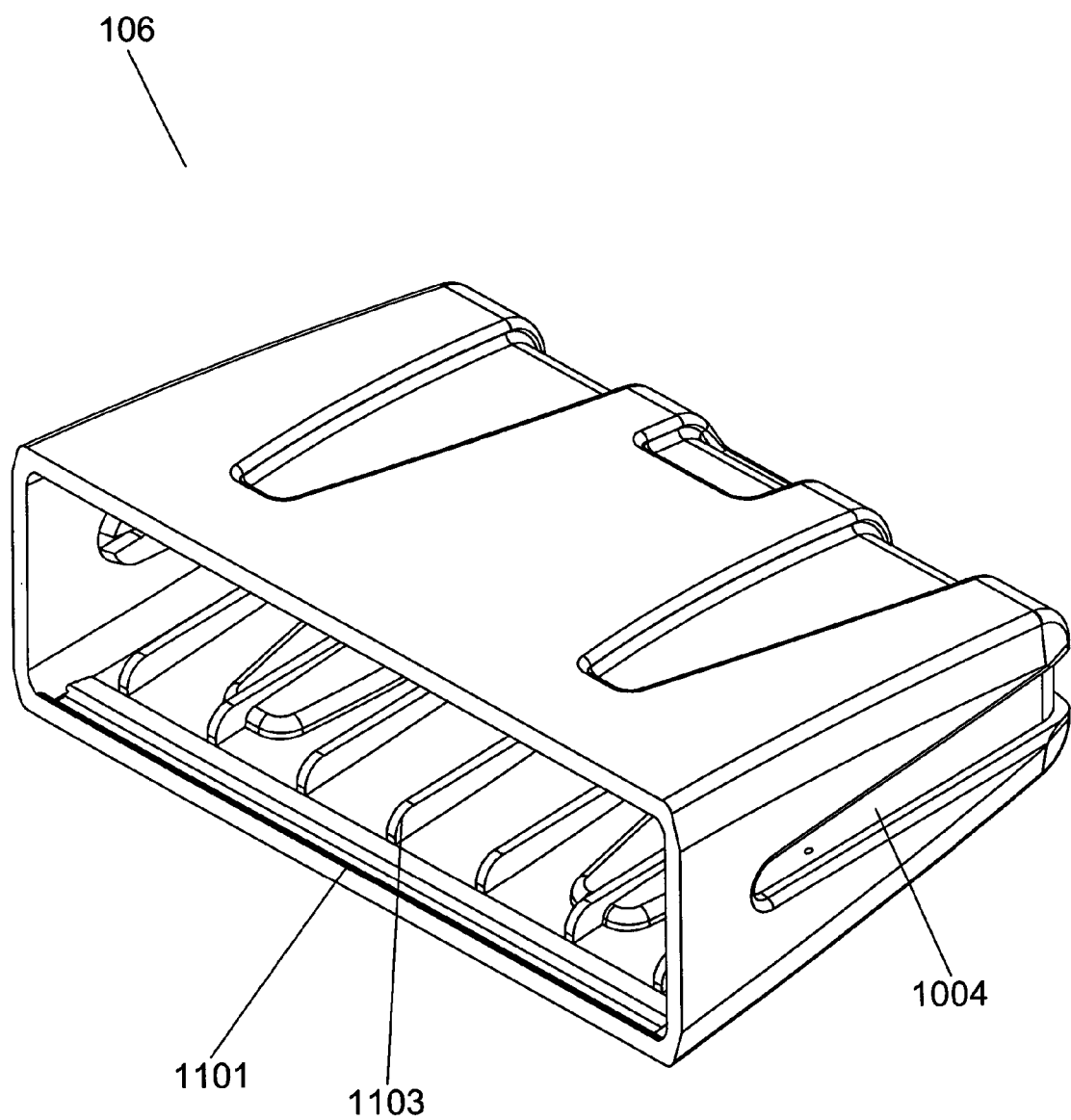
FIG. 11 is an inside perspective view of an end cap of the modular bunk cover apparatus and system.

FIG. 11 shows an inside perspective view of an end cap 106 of the modular bunk cover apparatus and system. Circumscribed about the perimeter of the end cap 106 is a lip 1101. The lip 1101 allows the end cap 106 to be connected to a modular bunk cover 104, as shown previously in FIG. 1. As can also be seen in FIG. 11, the interior of the end cap 106 contains ribs 1103 that add structural strength to the end cap 106 and provide for a tight fit of the end cap 106 to a bunk support member 206.

Figure 12:
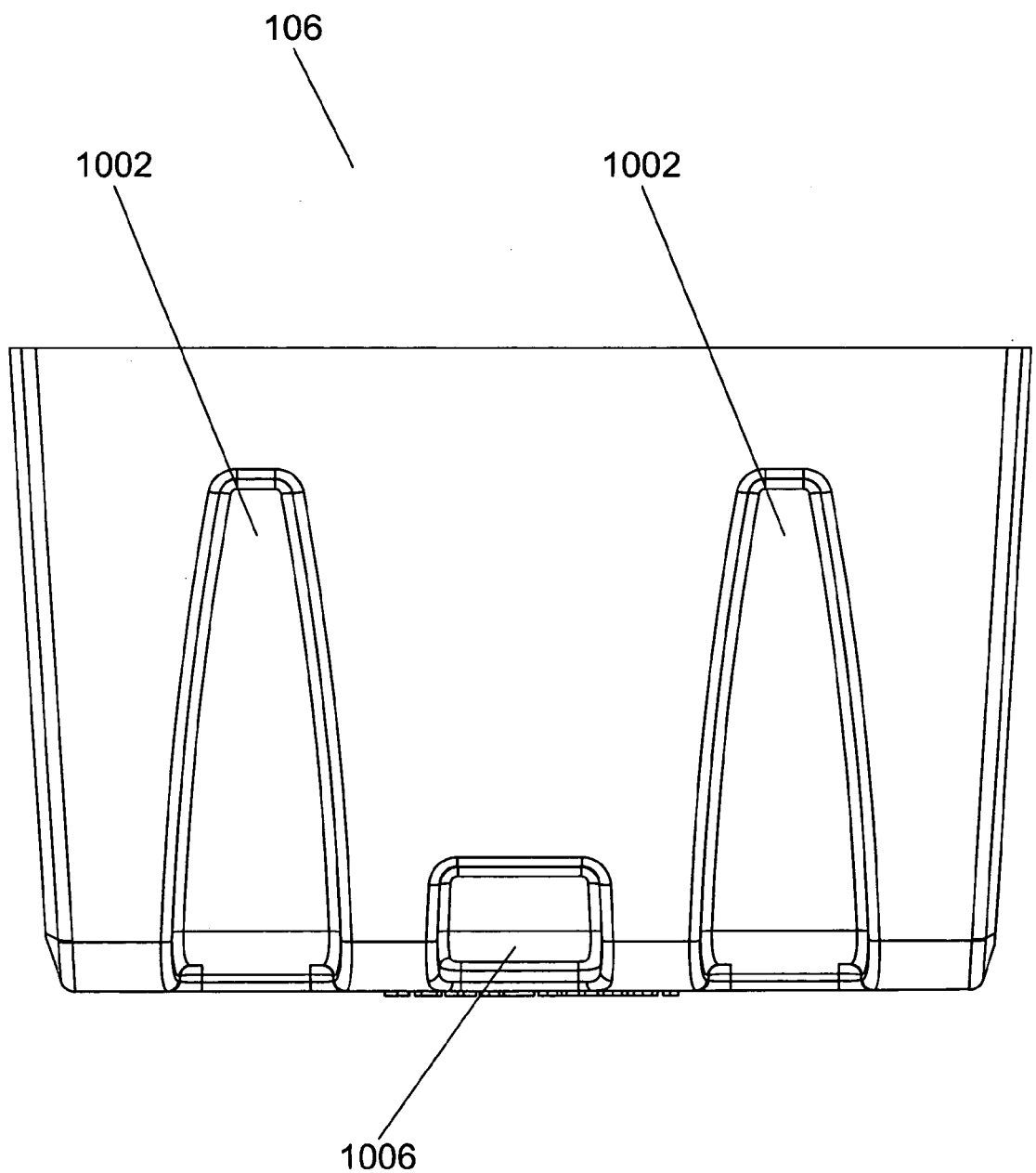
FIG. 12 is a top view of an end cap of the modular bunk cover apparatus and system.

FIG. 12 is a top view of an end cap 106 of the modular bunk cover apparatus and system. The drainage coves 1002 and the truncated drainage cove 1006 can be seen.

Figure 13:
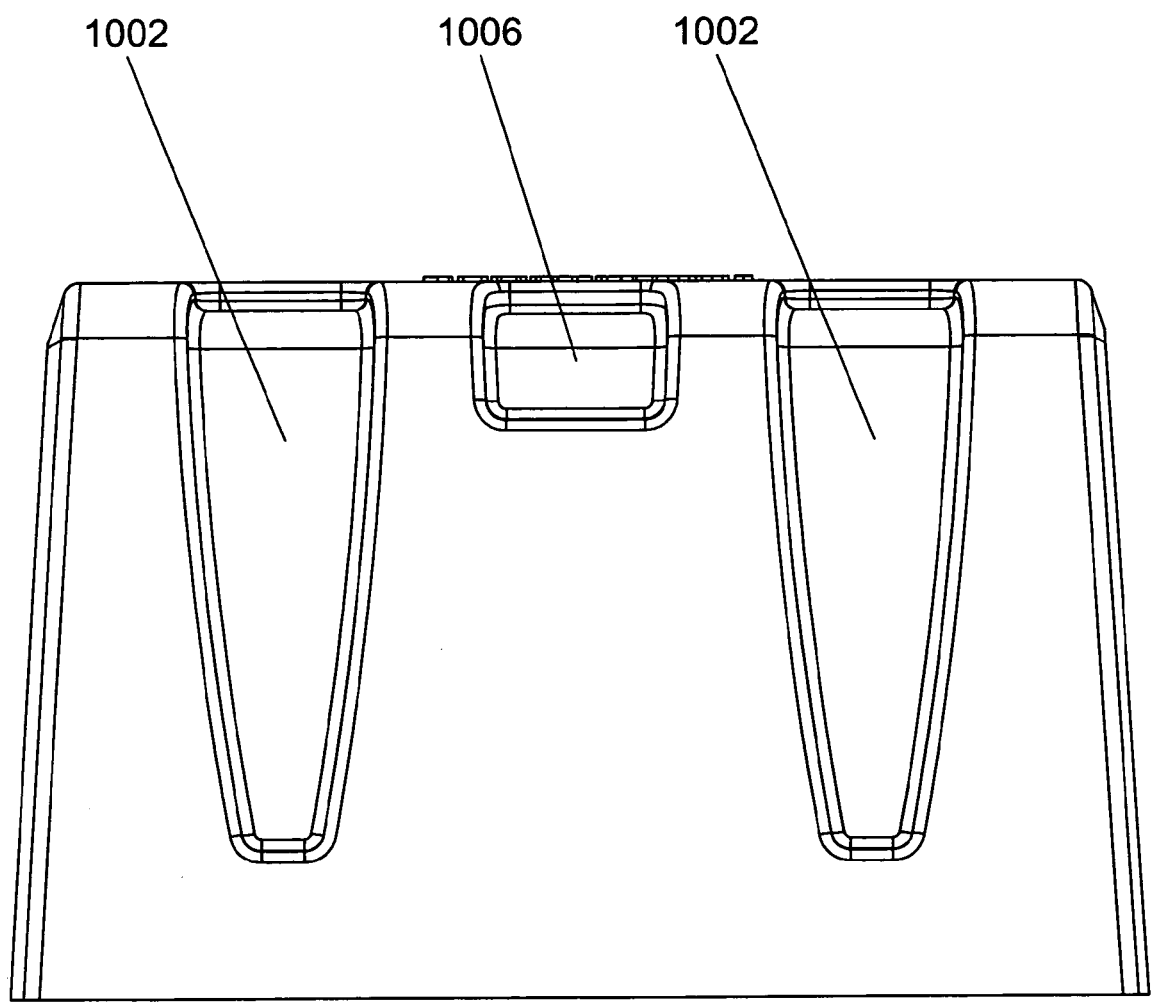
FIG. 13 is a bottom view of an end cap of the modular bunk cover apparatus and system.

FIG. 13 is a bottom view of an end cap of the modular bunk cover apparatus and system also showing the drainage coves 1002 and the truncated drainage cove 1006.

Figure 14:
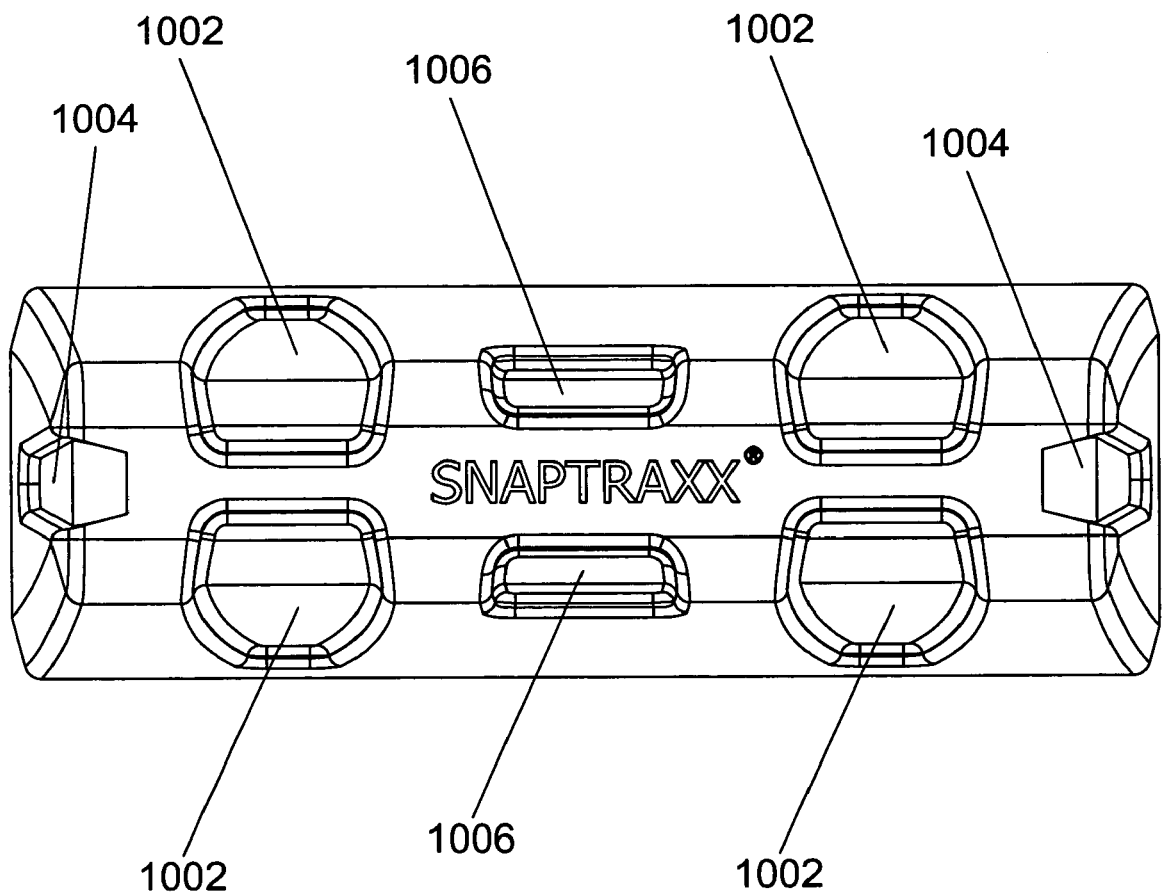
FIG. 14 is an end view of an end cap of the modular bunk cover apparatus and system.

FIG. 14 is an end view of an end cap 106 of the modular bunk cover apparatus and system. The drainage coves 1002, the truncated drainage coves 1006 and the channels 1004 can be seen. A product name, product logo, or other information, may be molded into, or placed on, the end cap using techniques that are known to those skilled in the art. In some embodiments of the present invention, an overmold may be placed on the end cap 106, using materials and processes that are similar to the overmold 308 placed on the overmolded half sleeve 300 that has been previously described.

Figure 15:
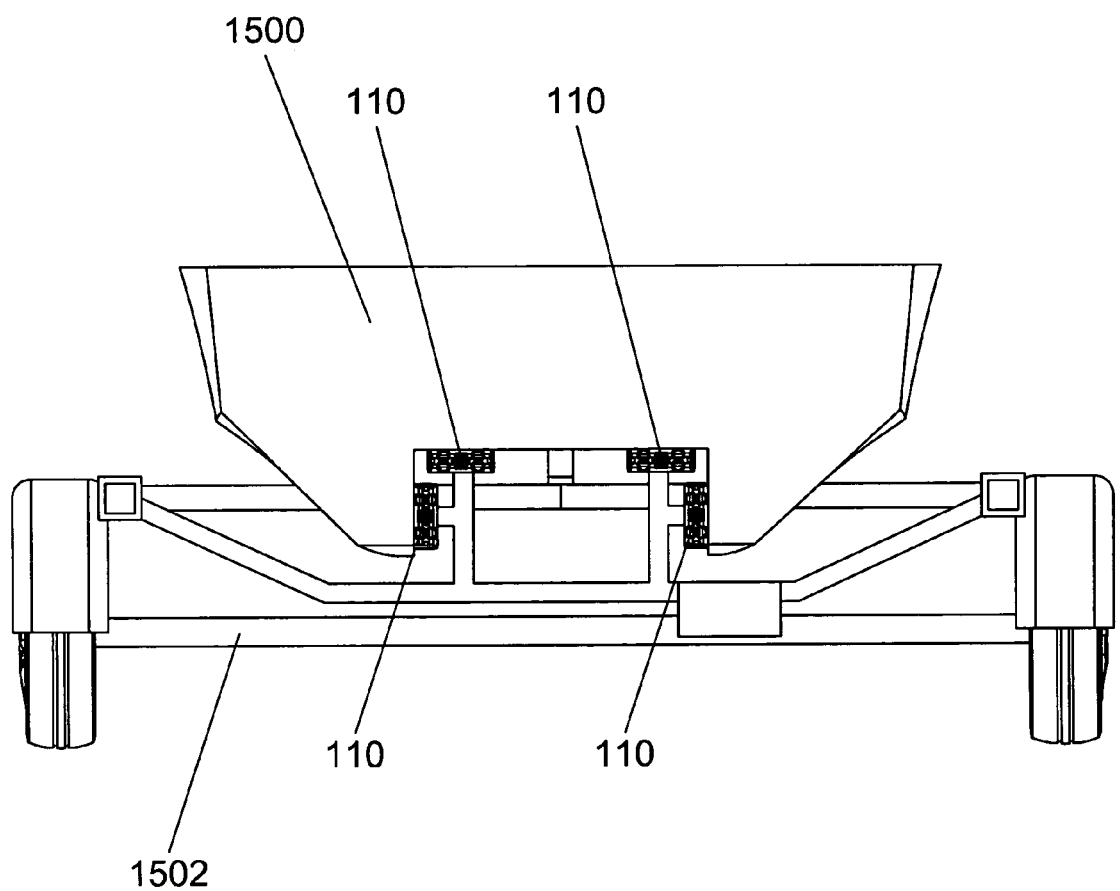
FIG. 15 shows the modular bunk cover apparatus and system in use on a trailer carrying a tunnel hull boat.
Figure 16:
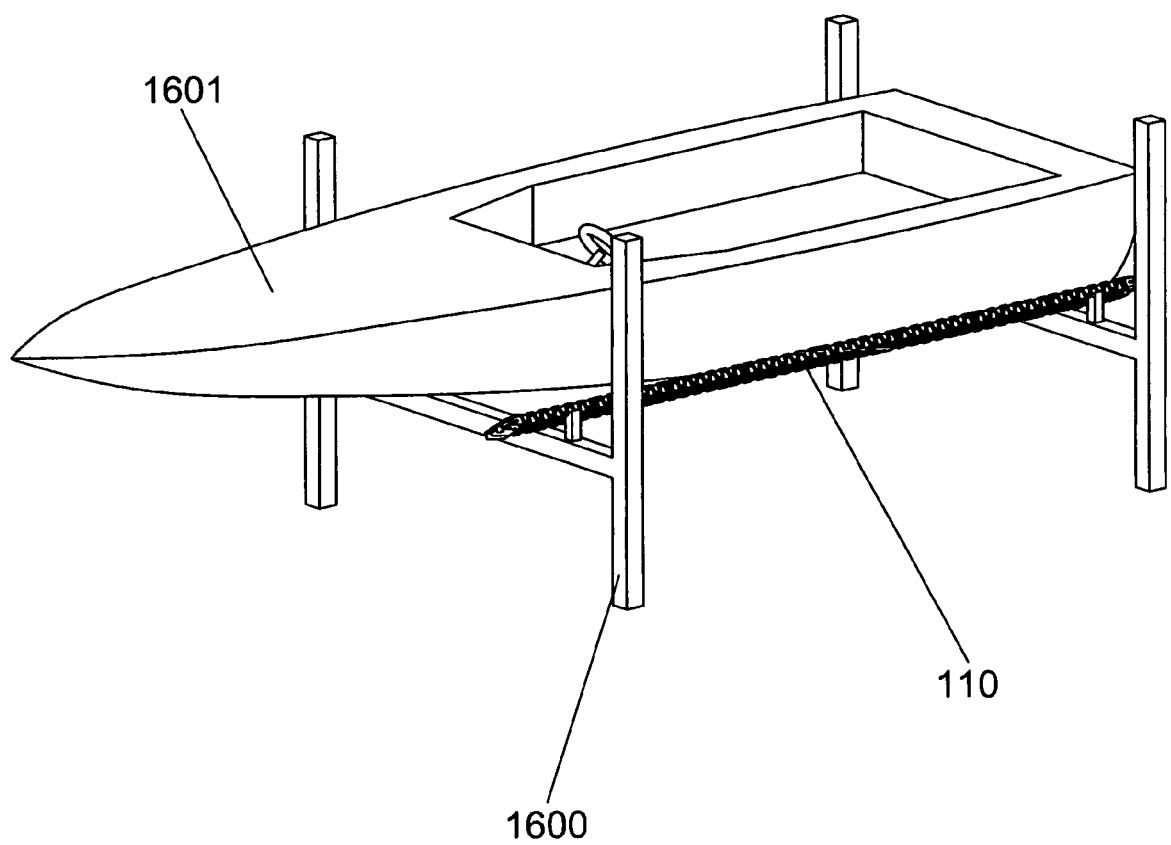
FIG. 16 shows the modular bunk cover apparatus and system in use on a boat lift.
Figure 17:
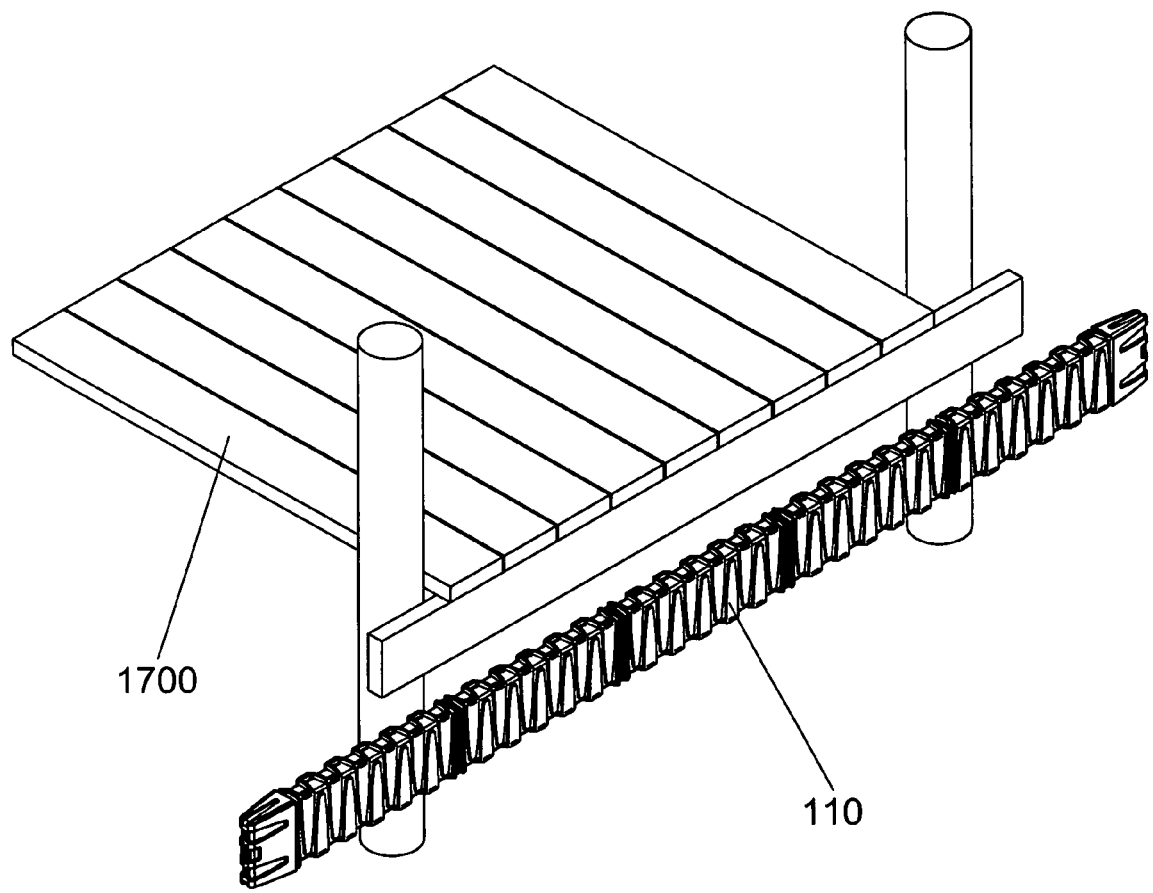
FIG. 17 shows the modular bunk cover apparatus and system in use on a dock.
Figure 18:
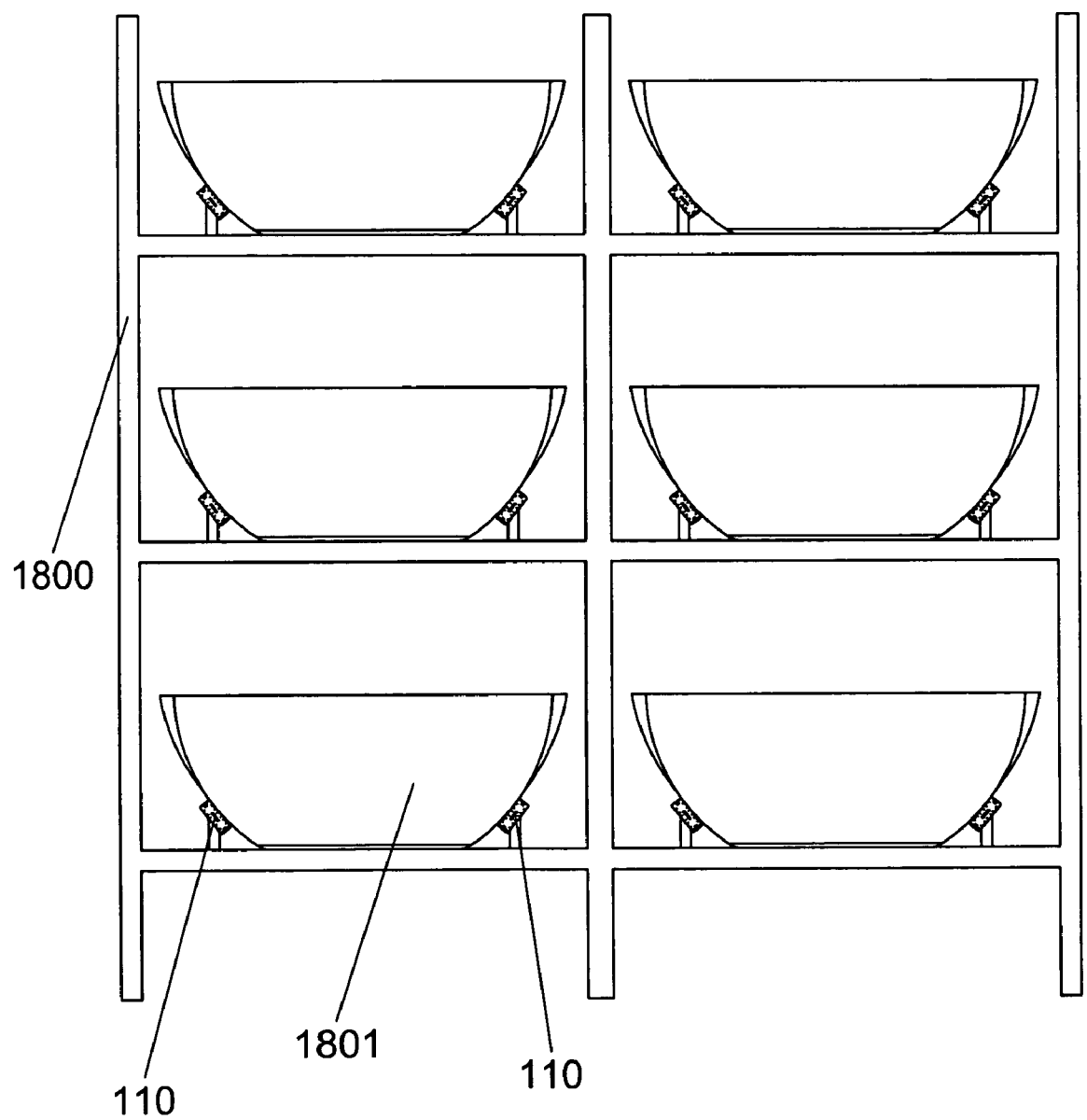
FIG. 18 shows the modular bunk cover apparatus and system in use on a boat storage rack.

FIG. 15 shows the modular bunk cover apparatus and system in use on a trailer 1502 carrying a tunnel hull boat 1500. The placement and configuration of the modular bunk cover apparatus and system can vary substantially based on application. FIG. 1 has previously portrayed a standard boat trailer that contains two bunks. In FIG. 15, a highly specialized tunnel hull boat 1500 is shown placed on four bunks 110 that are attached to a trailer 1502. The modular bunk covers may be interconnected to accommodate varying bunk lengths and applications. The applications are not limited to boat trailers, but rather, include any structure where contact with a boat occurs. For example, FIG. 16 shows a boat lift 1600 that contains two bunks 110 that support a boat 1601. The boat lift 1600 may be a cantilever style lift, a suspension lift, a vertical lift, a beach rail system, or the like. The modular bunk cover apparatus and system may also be used in a docking system. FIG. 17 shows a dock 1700 with a bunk 110 that is protected with the modular bunk cover apparatus and system of the present invention. The bunk 110 may be mechanically connected to the dock 1700 using fasteners such as screws, bolts, brackets, and the like. There are numerous other applications for the modular bunk cover apparatus and system. FIG. 18 shows a marina storage rack 1800 that uses bunks 110 protected with the modular bunk cover apparatus and system of the present invention. Other applications will become evident to those skilled in the art.

It is, therefore, apparent that there has been provided, in accordance with the various objects of the present invention, a modular bunk cover apparatus and system. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A modular bunk cover comprising:
a first half sleeve having a plurality of tongues and a plurality of receivers wherein each tongue contains a slot and each receiver contains a locking tab, the first half sleeve being connected to a second half sleeve having a plurality of tongues and a plurality of receivers wherein each tongue contains a slot and each receiver contains a locking tab; wherein the tongues of the first half sleeve are mated to the receivers of the second half sleeve and wherein the tongues of the second half sleeve are mated to the receivers of the first half sleeve and wherein the locking tabs of the first half sleeve receivers are inserted in the slots of the second half sleeve tongues and the locking tabs of the second half sleeve receivers are inserted in the slots of the first half sleeve tongues.

2. The bunk cover as recited in claim 1, further including a plurality of drainage spaces defined on the first half sleeve and the second half sleeve.

3. The bunk cover as recited in claim 1, further including an overmold bonded to a surface of the first half sleeve for modifying the friction characteristics of the first half sleeve.

4. The bunk cover as recited in claim 1, further including an overmold containing an antimicrobial additive bonded to a surface of the first half sleeve for modifying the friction characteristics of the first half sleeve.

5. The bunk cover as recited in claim 1, further including an overmold containing an ultraviolet inhibitor additive bonded to a surface of the first half sleeve for modifying the friction characteristics of the first half sleeve.

6. The bunk cover as recited in claim 1, further including an overmold containing a scratch and mar resistant additive bonded to a surface of the first half sleeve for modifying the friction characteristics of the first half sleeve.

7. The bunk cover as recited in claim 1, further including an overmold containing a color additive bonded to a surface of the first half sleeve for modifying the friction characteristics of the first half sleeve.

8. The bunk cover as recited in claim 1, further including an expansion joint attached to the first half sleeve and an expansion joint attached to the second half sleeve.

9. The bunk cover as recited in claim 1, further including a plurality of spikes attached to the inner surface of the first half sleeve for preventing slippage of the bunk cover on a bunk.

10. The bunk cover as recited in claim 1, further including a plurality of spikes attached to the inner surface of the second half sleeve for preventing slippage of the bunk cover on a bunk.

* * * * *